R. F. Fisher and G. E. Waldron Improved Valve.

No. 116580

PATENTED JUL 4 1871

Witnesses,
L. E. Batchelder
W. H. Cambridge

Inventors,
R. F. Fisher and
G. E. Waldron per
their Attorneys
Teschemacher & Stearns 116,580

UNITED STATES PATENT OFFICE.

ROBERT F. FISHER AND GEORGE F. WALDRON, OF BOSTON, MASSACHUSETTS, ASSIGNORS TO GEORGE F. WALDRON.

IMPROVEMENT IN MEASURING-FUNNELS.

Specification forming part of Letters Patent No. 116,580, dated July 4, 1871; antedated June 20, 1871.

*To all whom it may concern:*

Be it known that we, ROBERT F. FISHER and GEORGE F. WALDRON, both of Boston, in the county of Suffolk and State of Massachusetts, have invented an Improved Valve for Liquids, of which the following is a full, clear, and exact description, reference being had to the accompanying drawing making part of this specification, in which—

Figure 1:
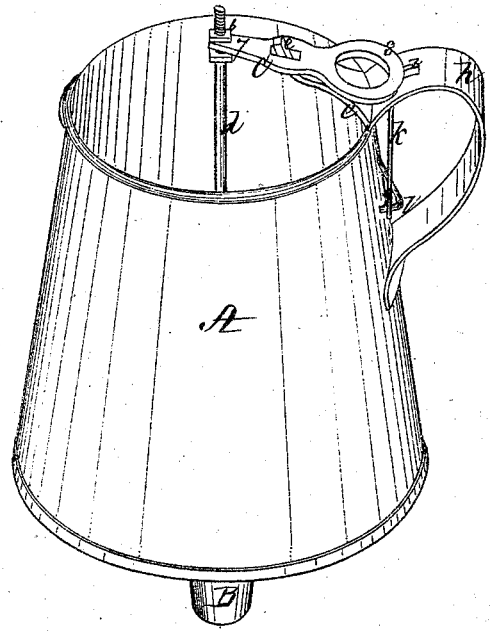
Figure 2:
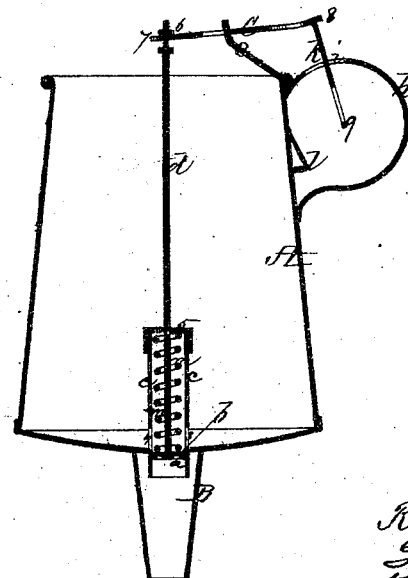

Figure 1 is a perspective view of a combined measure and funnel with our improved valve applied thereto, and showing the upper part of the valve-rod and device for operating the valve in the position they occupy when the valve is raised off its seat. Fig. 2 is a vertical section through the center of the same when the valve is down upon its seat.

Our invention relates to certain improvements in the valve which controls the passage from the bottom of a measure or receptacle to its funnel or outlet, and in certain mechanical devices for operating the same; and our invention consists in a valve-plug placed within a tube rising from the center of the interior of the receptacle or point where it connects with the funnel or outlet, the valve-plug being pressed down upon the valve-seat to close the discharge-orifice by a spring, also inclosed within the tube, and the said plug being raised against the resistance of the spring to open the discharge-orifice by the pressure of the thumb applied to the outer end of a lever connected with the valve-rod, a hook or catch being employed for holding the valve-plug up from its seat instead of applying the thumb to the lever for this purpose.

To enable others skilled in the art to understand and use our invention, we will proceed to describe the manner in which we have carried it out.

In the said drawing, A represents the measure or receptacle into which the liquid to be measured is placed. At the center of the bottom of this measure is soldered a conical spout or funnel, B, forming at the junction a discharge-orifice, *a*, which is controlled by a valve-plug, *b*, inclosed by a tube, *c*, extending vertically up within the measure A. The lower portion of the tube *c* is provided with openings 3 4 diametrically opposite, which communicate with the discharge-orifice and through which the liquid passes thereto.

*d* is the valve-rod or spindle, which passes vertically up through a cap, 5, at the top of the tube *c*, and thence centrally up through the measure to a point a little above its top, where it is secured by screw-nuts 6 to the inner end 7 of a lever, C, which is pivoted at its center to an arm, *e*, projecting up from the side and over the interior of the measure. The outer end 8 of this lever is enlarged, and open at its center to adapt itself to the form and size of the thumb. *h* is the handle of the measure, through a slot, *i*, in which passes a rod, *k*, the upper end of which is secured to the outer end of the lever C, the lower end of the rod *k* terminating in a hook, 9, which is intended, when desired, to be caught over a projection, *l*, on the outside of the measure. Surrounding the valve-rod *d*, and inclosed within the tube *c*, is a spiral spring, *m*, the lower end of which bears upon the valve-plug *b* while its upper end bears against the under side of the cap 5 of the tube, by which construction a pressure is exerted upon the plug to keep it down on a washer at its seat, and the discharge-orifice is thus tightly closed.

When the measure contains a liquid, and it is desired to allow it to pass down the funnel into a jug or other receptacle, it is simply necessary to insert the lower end of the funnel therein and press the inner end of the lever C down, with the thumb of the hand holding the measure, sufficiently to compress the spring *m*, when the valve-rod is raised, and with it the valve-plug *b*, off its seat, thus opening the discharge-orifice and allowing the liquid to escape therefrom, through the openings 3 4 in the bottom of the tube, down the funnel into the jug or other receptacle. When the measure is of considerable capacity, and it is not convenient to hold it and keep the thumb pressed down on the outer end of the lever C, the rod 9 may be caught over the projection *l* and the valve-plug be thus kept up off its seat to allow of the liquid flowing down through the funnel into the jug to be filled.

If desired, the base of the measure may be provided with an annular ring in order that the ring may serve as a support to hold the measure securely on the outside of the jug.

Instead of applying our improved valve to a measuring-funnel it may also be applied to a barrel containing liquor of any description, to a water-tank for water-closets, or in any other position where a convenient and reliable valve is required.

What we claim as our invention, and desire to secure by Letters Patent, is—

The tube $c$ with its openings 3 4, in combination with a valve-plug, $b$, spring $m$, valve-rod $d$, lever C, hooked rod $k$, and projection $l$, the whole arranged and operating substantially as and for the purpose set forth.

Witness our hands this 31st day of October, A. D. 1870.

R. F. FISHER.
GEO. F. WALDRON.

Witnesses:
N. W. STEARNS,
W. J. CAMBRIDGE.